(12) United States Patent
Wang

(10) Patent No.: US 8,780,079 B2
(45) Date of Patent: Jul. 15, 2014

(54) TOUCH PANEL AND METHOD FOR DETECTING TOUCH POSITION THEREOF AND TOUCH DISPLAY APPARATUS

(75) Inventor: Jin-jie Wang, Shenzhen (CN)

(73) Assignee: Shenzhen Chi Na Star Optoelectronics Technology Co., Ltd., Guangdong (CN)

( * ) Notice: Subject to any disclaimer, the term of this patent is extended or adjusted under 35 U.S.C. 154(b) by 231 days.

(21) Appl. No.: 13/379,897

(22) PCT Filed: Nov. 16, 2011

(86) PCT No.: PCT/CN2011/082258
§ 371 (c)(1),
(2), (4) Date: Dec. 21, 2011

(87) PCT Pub. No.: WO2013/071495
PCT Pub. Date: May 23, 2013

(65) Prior Publication Data
US 2013/0120308 A1    May 16, 2013

(30) Foreign Application Priority Data
Nov. 15, 2011    (CN) .......................... 2011 1 0361063

(51) Int. Cl.
*G06F 3/045* (2006.01)
*G06F 3/044* (2006.01)
(52) U.S. Cl.
CPC ...................................... *G06F 3/044* (2013.01)
USPC .......................... 345/174; 345/173; 178/18.06
(58) Field of Classification Search
USPC ...................... 345/173–178; 178/18.01–18.11
See application file for complete search history.

(56) References Cited

U.S. PATENT DOCUMENTS

| | | | | |
|---|---|---|---|---|
| 8,477,116 | B2 * | 7/2013 | Ningrat | 345/174 |
| 2008/0150906 | A1 * | 6/2008 | Grivna | 345/173 |
| 2008/0231606 | A1 * | 9/2008 | Moon | 345/173 |
| 2009/0167718 | A1 * | 7/2009 | Lee et al. | 345/174 |
| 2011/0115743 | A1 * | 5/2011 | Wang et al. | 345/174 |
| 2011/0141034 | A1 * | 6/2011 | Lai et al. | 345/173 |
| 2011/0248932 | A1 * | 10/2011 | Wu et al. | 345/173 |
| 2012/0188196 | A1 * | 7/2012 | Liu et al. | 345/174 |

* cited by examiner

*Primary Examiner* — Koosha Sharifi-Tafreshi
(74) *Attorney, Agent, or Firm* — Mark M. Friedman

(57) ABSTRACT

The present invention provides a touch panel, a method for detecting touch positions thereof and a touch display apparatus. The touch panel comprises first sensing pads arranged along a first direction, second sensing pads arranged along a second direction and third sensing pads arranged along a third direction. The method comprises the following steps: detecting a capacitance variation of the first sensing pads; detecting a capacitance variation of the second sensing pads; detecting a capacitance variation of the third sensing pads; and determining the at least one touch position according to the capacitance variation of the sensing pads. The present invention can improve the ghost-point problem of multiple touching.

12 Claims, 7 Drawing Sheets

TOUCH PANEL AND METHOD FOR DETECTING TOUCH POSITION THEREOF AND TOUCH DISPLAY APPARATUS

FIELD OF THE INVENTION

The present invention relates to a touch panel and a method for detecting touch positions thereof, and more particularly to a touch panel, a method for detecting touch positions thereof and a touch display apparatus for multiple touching.

BACKGROUND OF THE INVENTION

Displays have been widely applied in electrical products. Currently, a display can add an addition of functional panel for achieving various functionalities, such as adding a touch panel to achieve a touch control.

In a multi-touch sensitive device, such as a touch panel, there are generally two types of sensing methods for sensing one or more touches. One is called a projective sensing method, and the other is a matrix sensing method.

However, when the touch panel is used for multiple touching, a so-called "ghost point" is likely to occur, and thus it is incapable of distinguishing the unreal locations from the real one.

As a result, it is necessary to provide a touch panel, a method for detecting touch positions thereof and a touch display apparatus to solve the problems existing in the conventional technologies, as described above.

SUMMARY OF THE INVENTION

The present invention provides a touch panel, a method for detecting touch positions thereof and a touch display apparatus to solve the ghost point problem of multiple touching.

A primary object of the present invention is to provide a touch panel, and the touch panel comprises: a substrate; a plurality of first sensing pads disposed on the substrate and arranged along a first direction; a plurality of first connection lines disposed and connected between the first sensing pads; a plurality of second sensing pads disposed on the substrate and arranged along a second direction; a plurality of second connection lines disposed and connected between the second sensing pads; a plurality of third sensing pads disposed on the substrate and arranged along a third direction; and a plurality of third connection lines disposed and connected between the third sensing pads.

In one embodiment of the present invention, the touch panel further comprises an insulating layer for electrically isolating the first sensing pads, the second sensing pads and the third sensing pads at different directions.

In one embodiment of the present invention, an angle of 60 degrees is between the first direction and the third direction, and another angle of 60 degrees is between the second direction and the third direction.

In one embodiment of the present invention, the first sensing pads, the second sensing pads and the third sensing pads are rhombic or quadrilateral.

In one embodiment of the present invention, the first sensing pads, the second sensing pads and the third sensing pads are hexagonal.

Another object of the present invention is to provide a method for detecting at least one touch position on a touch panel, wherein the touch panel comprises a plurality of first sensing pads arranged along a first direction, a plurality of second sensing pads arranged along a second direction and a plurality of third sensing pads arranged along a third direction, and the method comprises the following steps: detecting a capacitance variation of the first sensing pads along the first direction; detecting a capacitance variation of the second sensing pads along the second direction; detecting a capacitance variation of the third sensing pads along the third direction; and determining the at least one touch position according to the capacitance variation of the first sensing pads, the second sensing pads and the third sensing pads.

In one embodiment of the present invention, when detecting the capacitance variation of the first sensing pads along the first direction, a first driving signal is transmitted to the first sensing pads, and when detecting the capacitance variation of the second sensing pads along the second direction, a second driving signal is transmitted to the second sensing pads, and when detecting the capacitance variation of the third sensing pads along the third direction, a third driving signal is transmitted to the third sensing pads.

In one embodiment of the present invention, the method further comprises the following steps: utilizing a register store sensing signals corresponding to different directions; and utilizing a controller to process the sensing signals corresponding to different directions for determining the at least one touch position.

In one embodiment of the present invention, the first direction is vertical to a first axis, and the second direction is vertical to a second axis, and the third direction is vertical to a third axis, and the first axis, the second axis and the third axis are arranged as a three-axis coordinate system, and the three-axis coordinate system corresponds to an orthogonal coordinate system for a display panel.

Still another object of the present invention is to provide a touch display apparatus, and the touch display apparatus comprises: a display panel; a touch panel disposed on the display panel, wherein the touch panel comprises: a substrate; a plurality of first sensing pads disposed on the substrate and arranged along a first direction; a plurality of first connection lines disposed and connected between the first sensing pads; a plurality of second sensing pads disposed on the substrate and arranged along a second direction; a plurality of second connection lines disposed and connected between the second sensing pads; a plurality of third sensing pads disposed on the substrate and arranged along a third direction; and a plurality of third connection lines disposed and connected between the third sensing pads.

The touch panel, the method for detecting touch positions thereof and the touch display apparatus of the present invention can detect multi-touch and exclude the unreal touch positions for improving the detecting precision of the touch panel.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
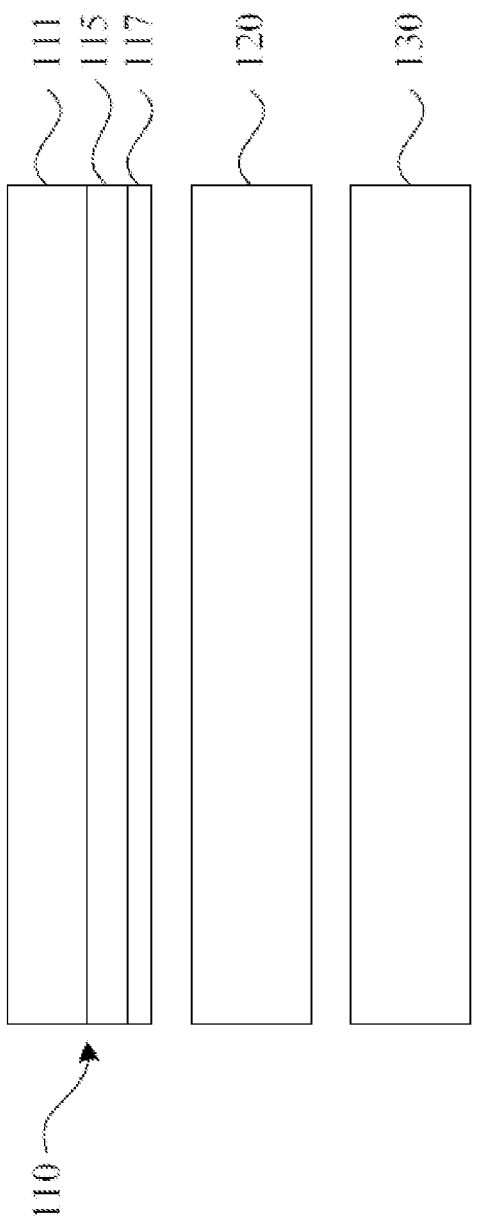
FIG. 1 is a cross-sectional view showing a touch display apparatus according to an embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Referring to FIG. 1, a cross-sectional view showing a touch display apparatus according to an embodiment of the present invention is illustrated. The touch display apparatus 100 of the present invention can sense the touch of a user's fingers or other objects and output corresponding signals. The touch display apparatus 100 comprises a touch panel 110 and a display panel 120. The touch panel 110 is disposed on the display panel 120 for sensing the touch of the fingers or objects. The display panel 120 may be a liquid crystal display (LCD) panel, an organic light emitting diode (OLED) panel, a plasma display panel (PDP) or a field emission display (FED) panel. Taking the LCD for example, the display panel 120 may be an LCD panel. At this time, the touch display apparatus 100 further comprises a backlight module 130 for providing backlight to the display panel 120 (LCD panel).

Figure 2A:
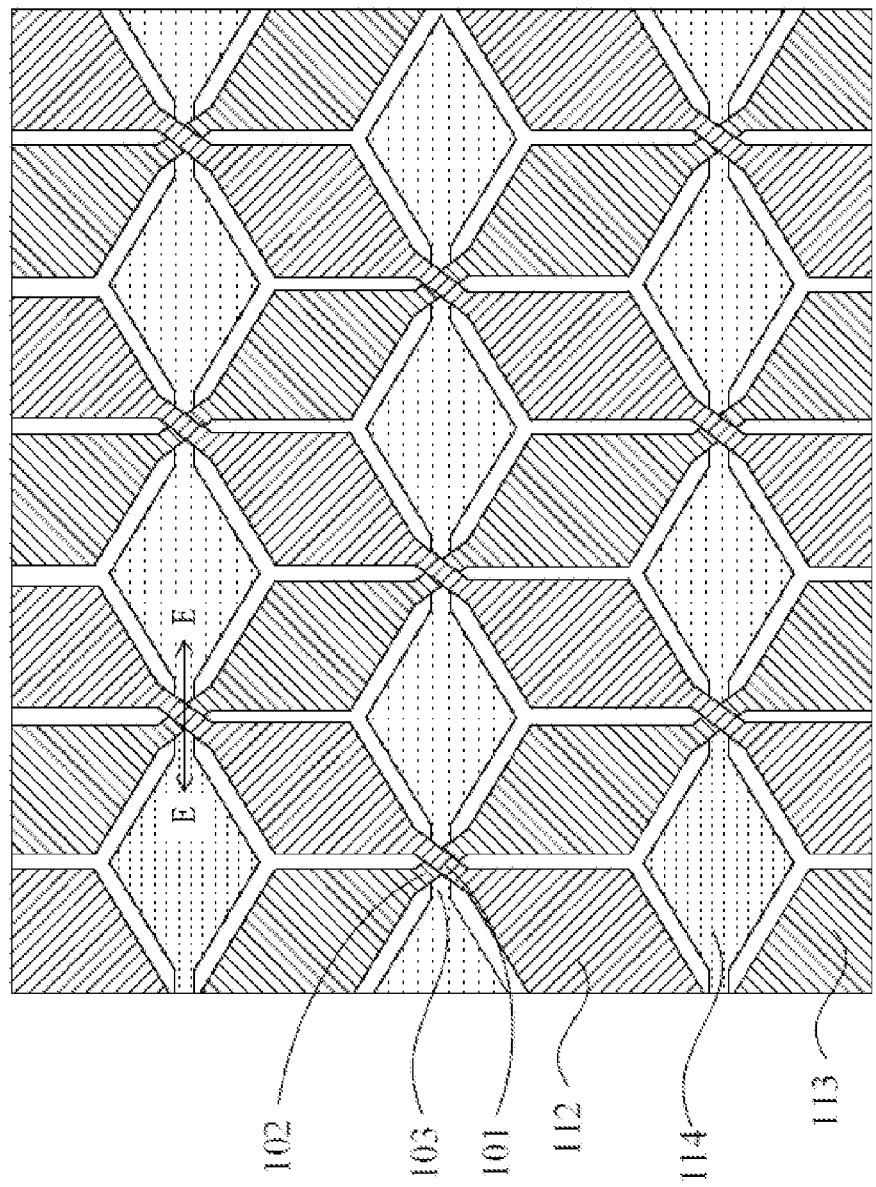
FIG. 2A and FIG. 2B are schematic diagrams showing sensing pads according to the preferred embodiment of the present invention.
Figure 2B:
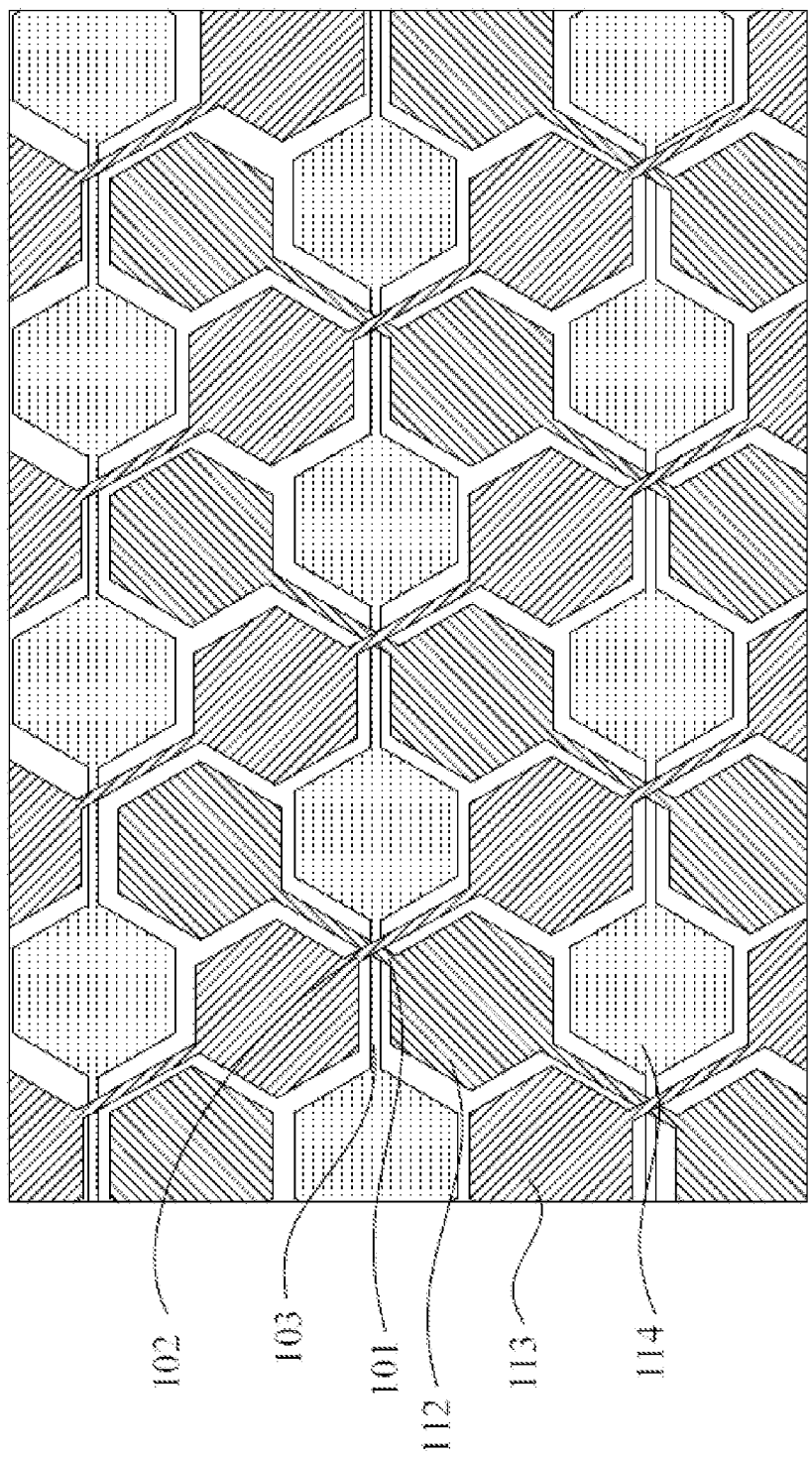

Referring to FIG. 1, FIG. 2A and FIG. 2B, FIG. 2A and FIG. 2B are schematic diagrams showing sensing pads according to the preferred embodiment of the present invention. The touch panel 110 of the present embodiment comprises a substrate 111, a plurality of first sensing pads 112, a plurality of second sensing pads 113 and a plurality of third sensing pads 114. The substrate 111 may be a glass substrate or a flexible transparent substrate. The sensing pads 112, 113 and 114 are arranged on the substrate 111, so as to form a touch sensing circuit layer 115, such as a capacitive touch sensing circuit layer, for sensing the touch or moving of the finger or object. The sensing pads 112, 113 and 114 are made of a transparent conductive material, such as ITO, IZO, ITZO, AZO, GZO, ZnO or PEDOT. The sensing pads 112, 113 and 114 are arranged on the substrate 111 in a matrix form for sensing the touch or moving of the object. In this embodiment, a shape of the sensing pads 112, 113 and 114 may be rhombic (referring to FIG. 2A), quadrilateral, hexagonal (referring to FIG. 2B) or other shapes.

Referring to FIG. 1, FIG. 2A and FIG. 2B again, there are a plurality of first connection lines 101 between the first sensing pads 112 for being electrically connected to the first sensing pads 112 along a first direction, and there are a plurality of second connection lines 102 between the second sensing pads 113 for being electrically connected to the second sensing pads 113 along a second direction, and there are a plurality of third connection lines 103 between the third sensing pads 114 for being electrically connected to the third sensing pads 114 along a third direction. The material of the connection lines 101, 102, 103 may be a transparent conductive material or metal.

Figure 3:
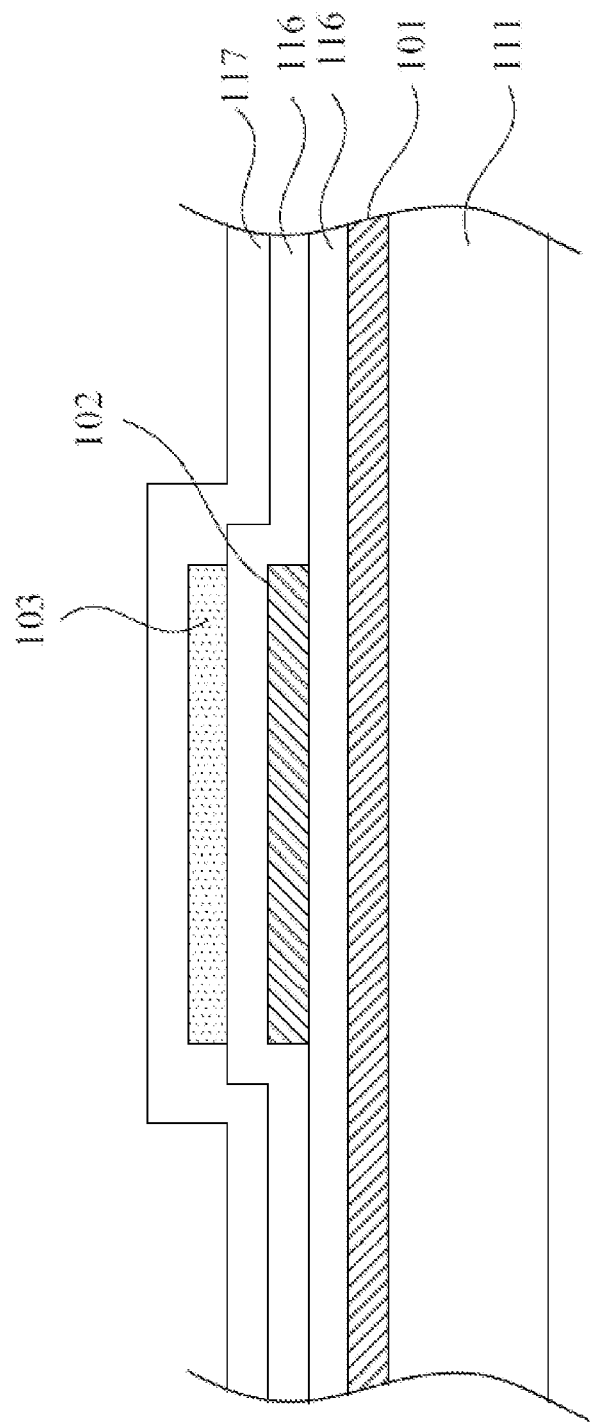
FIG. 3 is a cross-sectional view of along the cross-sectional line E-E shown in FIG. 2A.

Referring to FIG. 3, a cross-sectional view of along the cross-sectional line E-E shown in FIG. 2A is illustrated. In this embodiment, the touch panel 110 may further comprise an insulating layer 116 and a passivation layer 117. The insulating layer 116 may be made of a transparent insulating material and formed between the connection lines 101, 102, 103 for electrically isolating the sensing pads 112, 113 and 114 at different directions. The passivation layer 117 may be made of a transparent insulating material, such as silica ($SiO_2$). In another embodiment, for transmittance, the passivation layer 117 can be omitted.

Figure 4:
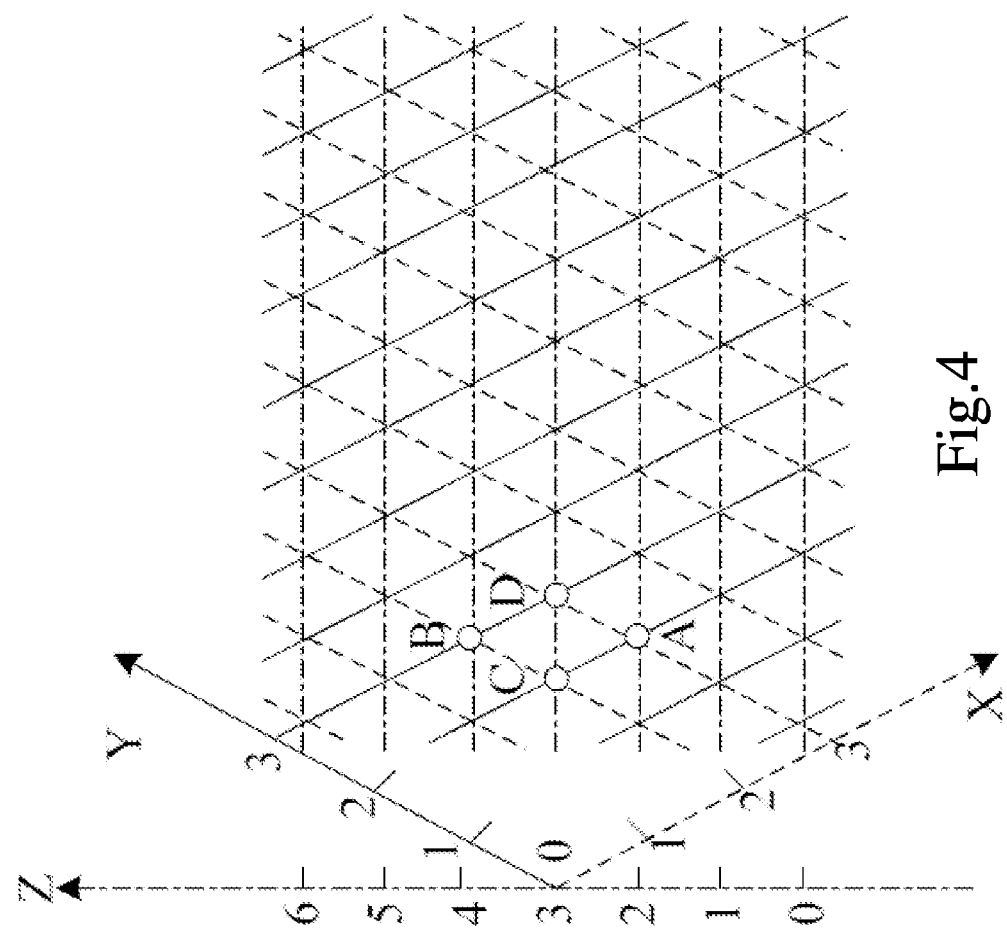
FIG. 4 is a cross-sectional view showing the touch display apparatus according to the preferred embodiment of the present invention.

Referring to FIG. 4, a cross-sectional view showing the touch display apparatus according to the preferred embodiment of the present invention is illustrated. The first sensing pads 112 are arranged along the first direction to form first sensing series. The first sensing series are parallel to the first direction and vertical to a first axis X. The second sensing pads 113 are arranged along the second direction to form second sensing series. The second sensing series are parallel to the second direction and vertical to a second axis Y. The third sensing pads 114 are arranged along the third direction to form third sensing series. The third sensing series are parallel to the third direction and vertical to a third axis Z. In this embodiment, an angle of 60 degrees is between the first direction and the third direction, and another angle of 60 degrees is also between the second direction and the third direction. Moreover, the first axis X, the second axis Y and the third axis Z can be arranged as a three-axis (3-axis) coordinate system.

When the touch display apparatus 100 performs the touch control function, the finger or object can touch an outer surface of the substrate 111 of the touch panel 110, and a capacitance variation (or pulse variation) resulting from the touch thereof can be detected by the touch sensing circuit which is formed by the sensing pads 112, 113 and 114. When detecting at least one touch position on the touch panel 110, the detecting method of the present invention comprises the following steps: detecting a capacitance variation of the first sensing pads 112 along the first direction; detecting a capacitance variation of the second sensing pads 113 along the second direction; detecting a capacitance variation of the third sensing pads 114 along the third direction; and determining the touch position according to the capacitance variation of the sensing pads 112, 113 and 114.

Referring to FIG. 4 again, for example, when real touch positions of the finger on the touch panel 110 are located at points A and B, it is detected that the sensing pads 112, 113 and 114 along different directions have the capacitance variation simultaneously at the points A (3,2,2) and B (2,3,4) in the 3-axis coordinate system which is formed by the axes X, Y and Z. Therefore, it is determined that the points A and B are the real touch positions. Contrarily, at points C (2,2,3) and D (3,3,3), there is no capacitance variation along the axis Z, i.e. it is not detected that the sensing pads 112, 113 and 114 along different directions have the capacitance variation simultaneously at the points C and D, and thus it is determined that the points C and D are unreal touch positions (i.e. ghost-points) and can be omitted. Accordingly, the 112, 113 and 114 arranged along more than three directions can raise a sensing precision and prevent the ghost-point problem. However, in other embodiments, the touch panel 110 can comprise more sensing pads arranged along a fourth direction or more directions but not limited to the above description.

Figure 5:
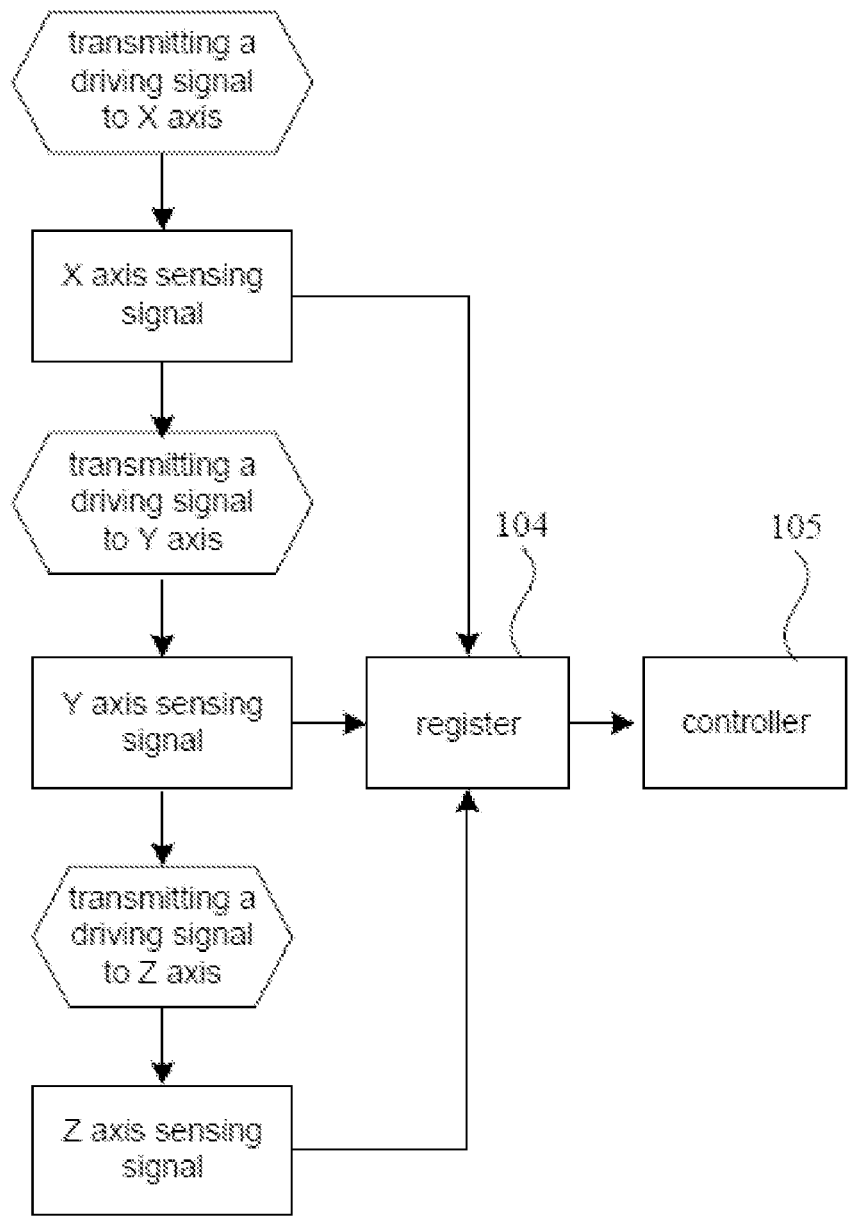
FIG. 5 is a block diagram of driving the touch panel according to the preferred embodiment of the present invention.

Referring to FIG. 5, a block diagram of driving the touch panel according to the preferred embodiment of the present invention is illustrated. When driving the touch panel 100 to detect the touch position, firstly, a driving signal is transmitted to the first sensing series (the first sensing pads 112) corresponding to the axis X (the first axis), so as to detect the capacitance variation of the first sensing pads 112 of the axis X, and to correspondingly generate a X axis sensing signal. The X axis sensing signal can be stored in a register 104. Subsequently, the driving signal is transmitted to the second sensing series (the second sensing pads 113) corresponding to the axis Y (the second axis), so as to detect the capacitance variation of the second sensing pads 113 of the axis Y, and to correspondingly generate a Y axis sensing signal. The Y axis sensing signal can be stored in the register 104. Subsequently, the driving signal is transmitted to the third sensing series (the third sensing pads 114) corresponding to the axis Z (the third axis), so as to detect the capacitance variation of the third sensing pads 114 of the axis Z, and to correspondingly generate a Z axis sensing signal. The Z axis sensing signal can be stored in the register 104. Thereafter, a controller can process the X axis sensing signal, the Y axis sensing signal and the Z axis sensing signal stored in the register 104 for identifying the real touch positions and excluding the unreal touch positions.

Figure 6:
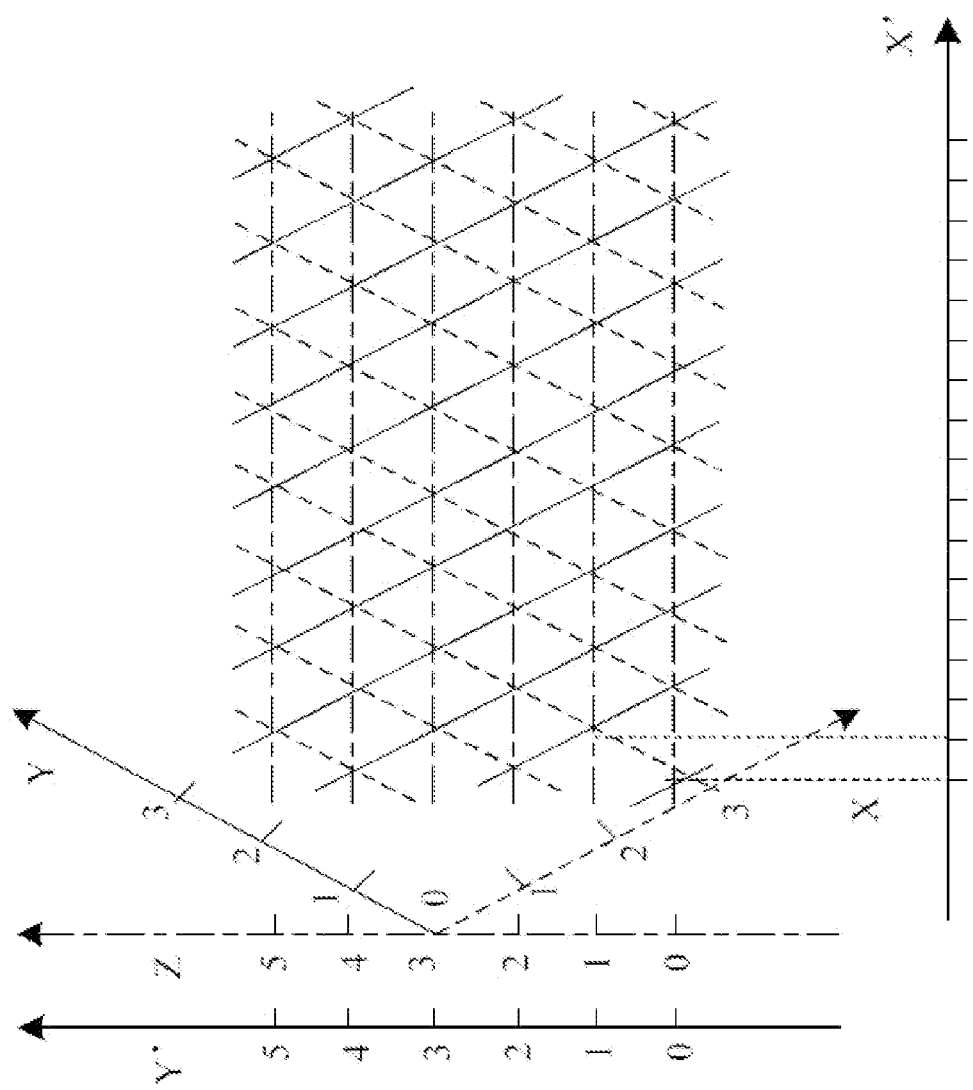
FIG. 6 is a schematic diagram showing the 3-axis coordinate system for the touch panel and a corresponding orthogonal coordinate system according to the preferred embodiment of the present invention.

Referring to FIG. 6, a schematic diagram showing the 3-axis coordinate system for the touch panel and a corresponding orthogonal coordinate system according to the preferred embodiment of the present invention is illustrated. For outputting the touch positions detected by the touch panel 100 to the display panel 120 to display images, the 3-axis coordinate system of the axes X,Y and Z is transformed into the orthogonal coordinate system for the display panel 120. In this embodiment, a midpoint of the axis Z acts as an origin of coordinates of the axes X and Y. When an amount of the third sensing series of the axis Z is an even number (for example Z=6), the origin of the coordinates of the axes X and Y is Z/2=3. When the amount of the third sensing series of the axis Z is an odd number (for example Z=5), the origin of the coordinates of the axes X and Y is (Z−1)12=2. When the 3-axis coordinate system is transformed into the new orthogonal coordinate system, and the amount of the third sensing series of the axis Z is an even number, coordinates of a fourth axis X' and a fifth Y' of the new orthogonal coordinate system can be expressed according to the following formula (1):

$$Y'=Z, X'=(X+Y)-Z/2 \quad (1).$$

When the 3-axis coordinate system is transformed into the new orthogonal coordinate system, and the amount of the third sensing series of the axis Z is an odd number, the coordinates of the fourth axis X' and the fifth Y' of the new orthogonal coordinate system can be expressed according to the following formula (2):

$$Y'=Z, X'=(X+Y)-(Z-1)/2 \quad (2).$$

In the above-mentioned formulas, X is the coordinates of the axis X, and Y is the coordinates of the axis Y, and Z is the coordinates of the axis Z.

As described above, the touch panel, the method for detecting touch positions thereof and the touch display apparatus of the present invention can detect multi-touch and use the sensing signal of more than three axes to identify the real touch positions and to exclude the unreal touch positions, thereby improving the detecting precision of the touch panel.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A touch panel, characterized in that: the touch panel comprises:
   a substrate;
   a plurality of first sensing pads disposed on the substrate and arranged along a first direction;
   a plurality of first connection lines disposed and connected between the first sensing pads;
   a plurality of second sensing pads disposed on the substrate and arranged along a second direction;
   a plurality of second connection lines disposed and connected between the second sensing pads;
   a plurality of third sensing pads disposed on the substrate and arranged along a third direction; a plurality of third connection lines disposed and connected between the third sensing pads;
   a register configured to store sensing signals corresponding to different directions; and
   a controller configured to process the sensing signals corresponding to different directions for determining the at least one touch position;
   wherein the first direction is vertical to a first axis X, and the second direction is vertical to a second axis Y, and the third direction is vertical to a third axis Z, and the first axis, the second axis and the third axis are arranged as a three-axis coordinate system, and the three-axis coordinate system corresponds to an orthogonal coordinate system for a display panel;
   wherein, when the three-axis coordinate system is transformed into the orthogonal coordinate system, and an amount of third sensing series arranged by the third sensing pads of the third axis is an even number, coordinates of a fourth axis X' and a fifth axis Y' of the orthogonal coordinate system is expressed according to the following formula:

$$Y'=Z, X'=(X+Y)-Z/2,$$

wherein, when the amount of the third sensing series is an odd number, the coordinates of the fourth axis X' and the fifth axis Y' of the orthogonal coordinate system is expressed according to the following formula:

$$Y'=Z, X'=(X+Y)-(Z-1)/2.$$

2. The touch panel according to claim 1, characterized in that: the touch panel further comprises an insulating layer for electrically isolating the first sensing pads, the second sensing pads and the third sensing pads at different directions.

3. The touch panel according to claim 1, characterized in that: an angle of 60 degrees is between the first direction and the third direction, and another angle of 60 degrees is between the second direction and the third direction.

4. The touch panel according to claim 1, characterized in that: the first sensing pads, the second sensing pads and the third sensing pads are rhombic or quadrilateral.

5. The touch panel according to claim 1, characterized in that: the first sensing pads, the second sensing pads and the third sensing pads are hexagonal.

6. A method for detecting at least one touch position on a touch panel, wherein the touch panel comprises a plurality of first sensing pads arranged along a first direction, a plurality of second sensing pads arranged along a second direction and a plurality of third sensing pads arranged along a third direction, characterized in that: the method comprises the following steps:

detecting a capacitance variation of the first sensing pads along the first direction;

detecting a capacitance variation of the second sensing pads along the second direction;

detecting a capacitance variation of the third sensing pads along the third direction; and determining the at least one touch position according to the capacitance variation of the first sensing pads, the second sensing pads and the third sensing pads;

utilizing a register store sensing signals corresponding to different directions; and utilizing a controller to process the sensing signals corresponding to different directions for determining the at least one touch position;

wherein the first direction is vertical to a first axis X, and the second direction is vertical to a second axis Y, and the third direction is vertical to a third axis Z, and the first axis, the second axis and the third axis are arranged as a three-axis coordinate system, and the three-axis coordinate system corresponds to an orthogonal coordinate system for a display panel;

wherein, when the three-axis coordinate system is transformed into the orthogonal coordinate system, and an amount of third sensing series arranged by the third sensing pads of the third axis is an even number, coordinates of a fourth axis X' and a fifth axis Y' of the orthogonal coordinate system is expressed according to the following formula:

$$Y'=Z, X'=(X+Y)-Z/2,$$

wherein, when the amount of the third sensing series is an odd number, the coordinates of the fourth axis X' and the fifth axis Y' of the orthogonal coordinate system is expressed according to the following formula:

$$Y'=Z, X'=(X+Y)-(Z-1)/2.$$

7. The method according to claim 6, characterized in that: when detecting the capacitance variation of the first sensing pads along the first direction, a first driving signal is transmitted to the first sensing pads, and when detecting the capacitance variation of the second sensing pads along the second direction, a second driving signal is transmitted to the second sensing pads, and when detecting the capacitance variation of the third sensing pads along the third direction, a third driving signal is transmitted to the third sensing pads.

8. A touch display apparatus, characterized in that: the touch display apparatus comprises:

a display panel;

a touch panel disposed on the display panel, wherein the touch panel comprises:

a substrate;

a plurality of first sensing pads disposed on the substrate and arranged along a first direction;

a plurality of first connection lines disposed and connected between the first sensing pads;

a plurality of second sensing pads disposed on the substrate and arranged along a second direction;

a plurality of second connection lines disposed and connected between the second sensing pads;

a plurality of third sensing pads disposed on the substrate and arranged along a third direction; and a plurality of third connection lines disposed and connected between the third sensing pads;

a register configured to store sensing signals corresponding to different directions; and a controller configured to process the sensing signals corresponding to different directions for determining the at least one touch position;

wherein the first direction is vertical to a first axis X, and the second direction is vertical to a second axis Y, and the third direction is vertical to a third axis Z, and the first axis, the second axis and the third axis are arranged as a three-axis coordinate system, and the three-axis coordinate system corresponds to an orthogonal coordinate system for a display panel;

wherein, when the three-axis coordinate system is transformed into the orthogonal coordinate system, and an amount of third sensing series arranged by the third sensing pads of the third axis is an even number, coordinates of a fourth axis X' and a fifth axis Y' of the orthogonal coordinate system is expressed according to the following formula:

$$Y'=Z, X'=(X+Y)-Z/2,$$

wherein, when the amount of the third sensing series is an odd number, the coordinates of the fourth axis X' and the fifth axis Y' of the orthogonal coordinate system is expressed according to the following formula:

$$Y'=Z, X'=(X+Y)-(Z-1)/2.$$

9. The touch display apparatus according to claim 8, characterized in that: the touch panel further comprises an insulating layer for electrically isolating the first sensing pads, the second sensing pads and the third sensing pads at different directions.

10. The touch display apparatus according to claim 8, characterized in that: an angle of 60 degrees is between the first direction and the third direction, and another angle of 60 degrees is between the second direction and the third direction.

11. The touch display apparatus according to claim 8, characterized in that: the first sensing pads, the second sensing pads and the third sensing pads are rhombic or quadrilateral.

12. The touch display apparatus according to claim 8, characterized in that: the first sensing pads, the second sensing pads and the third sensing pads are hexagonal.

* * * * *

UNITED STATES PATENT AND TRADEMARK OFFICE
CERTIFICATE OF CORRECTION

PATENT NO. : 8,780,079 B2  
APPLICATION NO. : 13/379897  
DATED : July 15, 2014  
INVENTOR(S) : Jin-jie Wang Page 1 of 1

It is certified that error appears in the above-identified patent and that said Letters Patent is hereby corrected as shown below:

In the Claims:

Column 7:

Claim 6, line 6 should be corrected as follows:
Change:
-- along the third direction; and --
to
"along the third direction;"

Signed and Sealed this
Seventh Day of October, 2014

Michelle K. Lee
*Deputy Director of the United States Patent and Trademark Office*